(12) United States Patent
Cheng et al.

(10) Patent No.: US 8,171,175 B2
(45) Date of Patent: May 1, 2012

(54) METHODS AND SYSTEMS USING DATA RATE DRIVEN PROTOCOL ACCELERATOR FOR MOBILE DEVICES

(75) Inventors: Steven Cheng, San Diego, CA (US);
Kuo-Chun Lee, San Diego, CA (US);
Tom Chin, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 269 days.

(21) Appl. No.: 12/359,106

(22) Filed: Jan. 23, 2009

(65) Prior Publication Data

US 2010/0191861 A1 Jul. 29, 2010

(51) Int. Cl.
*G06F 15/16* (2006.01)
(52) U.S. Cl. ..................................... 709/250
(58) Field of Classification Search .................. 709/232, 709/250
See application file for complete search history.

(56) References Cited

U.S. PATENT DOCUMENTS

| | | | |
|---|---|---|---|
| 5,281,963 A | 1/1994 | Ishikawa et al. | |
| 7,373,121 B1 * | 5/2008 | Bahai | 455/161.2 |
| 7,389,462 B1 | 6/2008 | Wang et al. | |
| 7,714,870 B2 | 5/2010 | Lippincott et al. | |
| 2004/0122952 A1 * | 6/2004 | Kistler et al. | 709/227 |
| 2007/0025395 A1 * | 2/2007 | Cardona et al. | 370/474 |
| 2007/0082688 A1 * | 4/2007 | Tu et al. | 455/515 |
| 2007/0201380 A1 * | 8/2007 | Ma et al. | 370/254 |
| 2008/0016287 A1 * | 1/2008 | Hepler | 711/147 |
| 2008/0089250 A1 * | 4/2008 | Jung | 370/276 |
| 2008/0119140 A1 * | 5/2008 | Maligeorgos et al. | 455/67.13 |
| 2008/0120426 A1 * | 5/2008 | Balakrishnan et al. | 709/230 |
| 2009/0063696 A1 * | 3/2009 | Wang et al. | 709/232 |

FOREIGN PATENT DOCUMENTS

WO WO03021436 A2 3/2003
WO WO2009052494 A2 4/2009

OTHER PUBLICATIONS

International Preliminary Report on Patentability—PCT/US2010/021895, The International Bureau of WIPO—Geneva, Switzerland, Apr. 15, 2011.
International Search Report & Written Opinion—US2010/021895—International Search Authority—European Patent Office—May 7, 2010.

* cited by examiner

*Primary Examiner* — Christopher Biagini
(74) *Attorney, Agent, or Firm* — Milan Patel; Charles Chesney

(57) ABSTRACT

By controlling whether operations are offloaded to a protocol stack hardware accelerator as a function of data rate, power consumption may be reduced, for example, when data rates result in fragmented or segmented data not suitable for processing by the stack hardware accelerator.

12 Claims, 7 Drawing Sheets

METHODS AND SYSTEMS USING DATA RATE DRIVEN PROTOCOL ACCELERATOR FOR MOBILE DEVICES

TECHNICAL FIELD

Certain embodiments of the present disclosure generally relate to wireless communication and, more particularly, to wireless communications with mobile devices utilizing hardware protocol accelerators.

SUMMARY

Certain embodiments provide a method for wireless communications. The method generally includes establishing one or more connections for exchanging data in a wireless network, offloading at least some operations associated with the connections to a hardware accelerator, monitoring data rates of the one or more connections, and determining whether or not to at least partially disable the protocol stack hardware accelerator based on the monitored data rates.

Certain embodiments provide an apparatus for wireless communications. The apparatus generally includes logic for establishing one or more connections for exchanging data in a wireless network, logic for offloading at least some operations associated with the connections to a hardware accelerator, logic for monitoring data rates of the one or more connections, and logic for determining whether or not to at least partially disable the protocol stack hardware accelerator based on the monitored data rates.

Certain embodiments provide an apparatus for wireless communications. The apparatus generally includes means for establishing one or more connections for exchanging data in a wireless network, means for offloading at least some operations associated with the connections to a hardware accelerator, means for monitoring data rates of the one or more connections, and means for determining whether or not to at least partially disable the protocol stack hardware accelerator based on the monitored data rates.

Certain embodiments provide a computer-program product for wireless communications, comprising a computer readable medium having instructions stored thereon, the instructions being executable by one or more processors. The instructions generally include instructions for establishing one or more connections for exchanging data in a wireless network, instructions for offloading at least some operations associated with the connections to a hardware accelerator, instructions for monitoring data rates of the one or more connections, and instructions for determining whether or not to at least partially disable the protocol stack hardware accelerator based on the monitored data rates.

BRIEF DESCRIPTION OF THE DRAWINGS

So that the manner in which the above-recited features of the present disclosure can be understood in detail, a more particular description, briefly summarized above, may be had by reference to embodiments, some of which are illustrated in the appended drawings. It is to be noted, however, that the appended drawings illustrate only certain typical embodiments of this disclosure and are therefore not to be considered limiting of its scope, for the description may admit to other equally effective embodiments.

DETAILED DESCRIPTION

Figure 1:
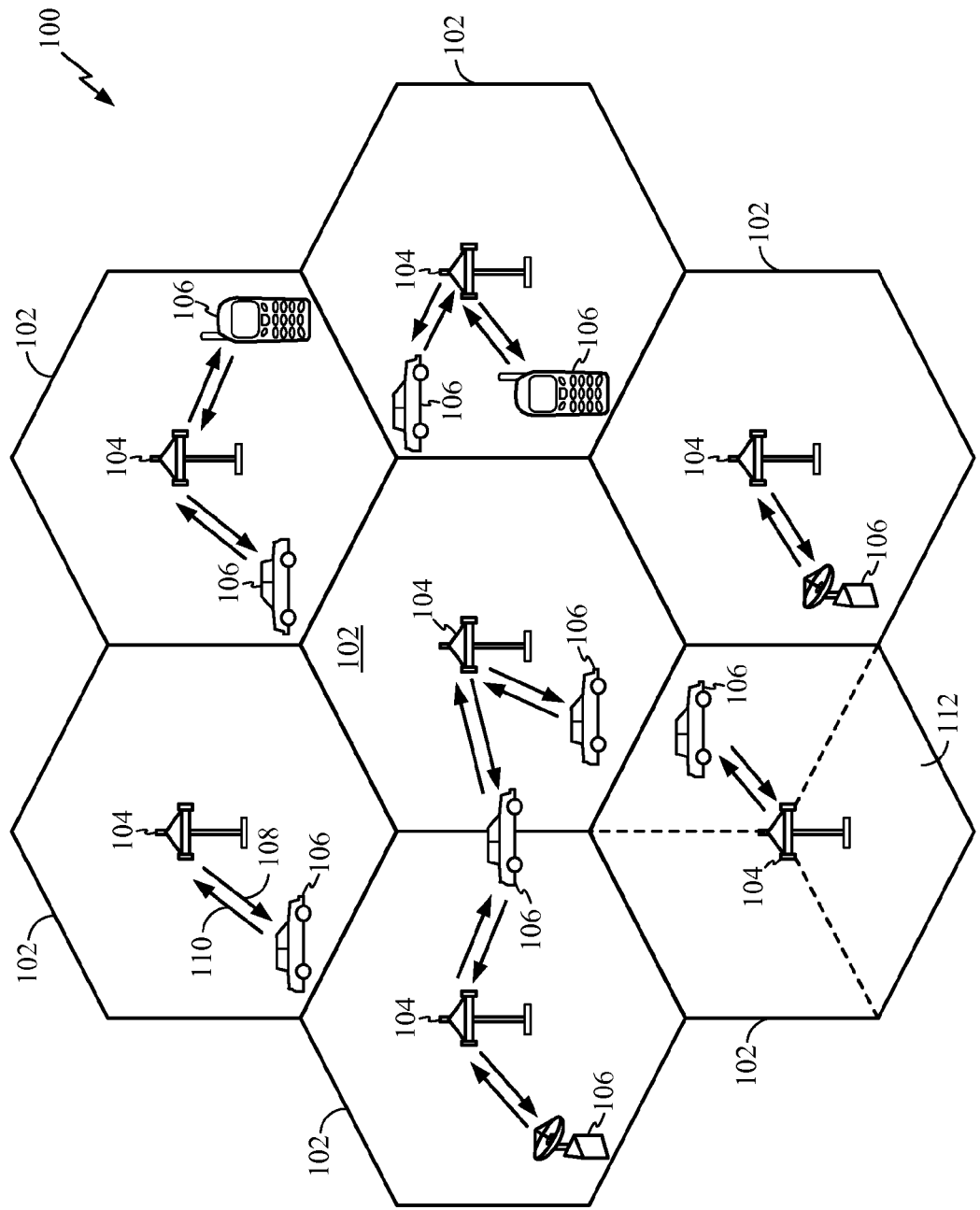
FIG. 1 illustrates an example wireless communication system, in accordance with certain embodiments of the present disclosure.

As wireless communication systems evolve, data rates continue to increase from the initial relatively low data rate required for conventional voice calls to high data rates of 300 Kbps for applications such as streaming video. In order to process data at these higher rates, mobile station (MS) processors must operate at higher rates and, often utilize protocol accelerators to speed processing by accelerating protocol stack computations.

Not all mobile devices use protocol accelerators and, often, the use of a protocol accelerator is a design choice. Protocol accelerators may not be justified with relatively simple protocols, where data rate is limited, and the processor is powerful. With more complex, high speed data rate protocols, however, the mobile device may only be able to meet performance requirements by offloading operations to a hardware protocol accelerator.

Some of the examples of the operations being offloaded into the hardware protocol accelerator include de-ciphering operations and error detection (e.g., cyclic redundancy check—CRC checking) as required in the media access control (MAC) layer of a mobile device.

Simply offloading all stack computations to a protocol accelerator, however, can be inefficient and result in needless power consumption, particularly when data rates are low resulting in fragmented or segmented data packets that is not suitable for processing by the protocol accelerator.

Certain embodiments of the present disclosure generally allow a protocol hardware accelerator to be controlled based on data rate of connections. As the data rates decrease, the likelihood of data being fragmented, making it unsuitable for processing by the protocol hardware accelerator may increase. Thus, in low data rate scenarios, the protocol hardware accelerator may be at least partially disabled. This may result in a reduction in power consumption, with little or no impact on overall performance.

Exemplary Wireless Communication System

The methods and apparatus of the present disclosure may be utilized in a broadband wireless communication system. As used herein, the term "broadband wireless" generally refers to technology that may provide any combination of wireless services, such as voice, Internet and/or data network access over a given area.

WiMAX, which stands for the Worldwide Interoperability for Microwave Access, is a standards-based broadband wireless technology that provides high-throughput broadband connections over long distances. There are two main applications of WiMAX today: fixed WiMAX and mobile WiMAX. Fixed WiMAX applications are point-to-multipoint, enabling broadband access to homes and businesses, for example. Mobile WiMAX offers the full mobility of cellular networks at broadband speeds.

Mobile WiMAX is based on OFDM (orthogonal frequency-division multiplexing) and OFDMA (orthogonal frequency division multiple access) technology. OFDM is a digital multi-carrier modulation technique that has recently found wide adoption in a variety of high-data-rate communication systems. With OFDM, a transmit bit stream is divided into multiple lower-rate substreams. Each substream is modulated with one of multiple orthogonal subcarriers and sent over one of a plurality of parallel subchannels. OFDMA is a multiple access technique in which users are assigned subcarriers in different time slots. OFDMA is a flexible multiple-access technique that can accommodate many users with widely varying applications, data rates, and quality of service requirements.

The rapid growth in wireless internets and communications has led to an increasing demand for high data rate in the field of wireless communications services. OFDM/OFDMA systems are today regarded as one of the most promising research areas and as a key technology for the next generation of wireless communications. This is due to the fact that OFDM/OFDMA modulation schemes can provide many advantages such as modulation efficiency, spectrum efficiency, flexibility, and strong multipath immunity over conventional single carrier modulation schemes.

IEEE 802.16x is an emerging standard organization to define an air interface for fixed and mobile broadband wireless access (BWA) systems. These standards define at least four different physical layers (PHYs) and one media access control (MAC) layer. The OFDM and OFDMA physical layer of the four physical layers are the most popular in the fixed and mobile BWA areas respectively.

FIG. 1 illustrates an example of a wireless communication system 100 in which embodiments of the present invention may be employed. The wireless communication system 100 may be a broadband wireless communication system. The wireless communication system 100 may provide communication for a number of cells 102, each of which is serviced by a base station 104. A base station 104 may be a fixed station that communicates with user terminals 106. The base station 104 may alternatively be referred to as an access point, a Node B, or some other terminology.

FIG. 1 depicts various user terminals 106 dispersed throughout the system 100. The user terminals 106 may be fixed (i.e., stationary) or mobile. The user terminals 106 may alternatively be referred to as remote stations, access terminals, terminals, subscriber units, mobile stations, stations, user equipment, etc. The user terminals 106 may be wireless devices, such as cellular phones, personal digital assistants (PDAs), handheld devices, wireless modems, laptop computers, personal computers, etc.

A variety of algorithms and methods may be used for transmissions in the wireless communication system 100 between the base stations 104 and the user terminals 106. For example, signals may be sent and received between the base stations 104 and the user terminals 106 in accordance with OFDM/OFDMA techniques. If this is the case, the wireless communication system 100 may be referred to as an OFDM/OFDMA system.

A communication link that facilitates transmission from a base station 104 to a user terminal 106 may be referred to as a downlink 108, and a communication link that facilitates transmission from a user terminal 106 to a base station 104 may be referred to as an uplink 110. Alternatively, a downlink 108 may be referred to as a forward link or a forward channel, and an uplink 110 may be referred to as a reverse link or a reverse channel.

A cell 102 may be divided into multiple sectors 112. A sector 112 is a physical coverage area within a cell 102. Base stations 104 within a wireless communication system 100 may utilize antennas that concentrate the flow of power within a particular sector 112 of the cell 102. Such antennas may be referred to as directional antennas.

Figure 2:
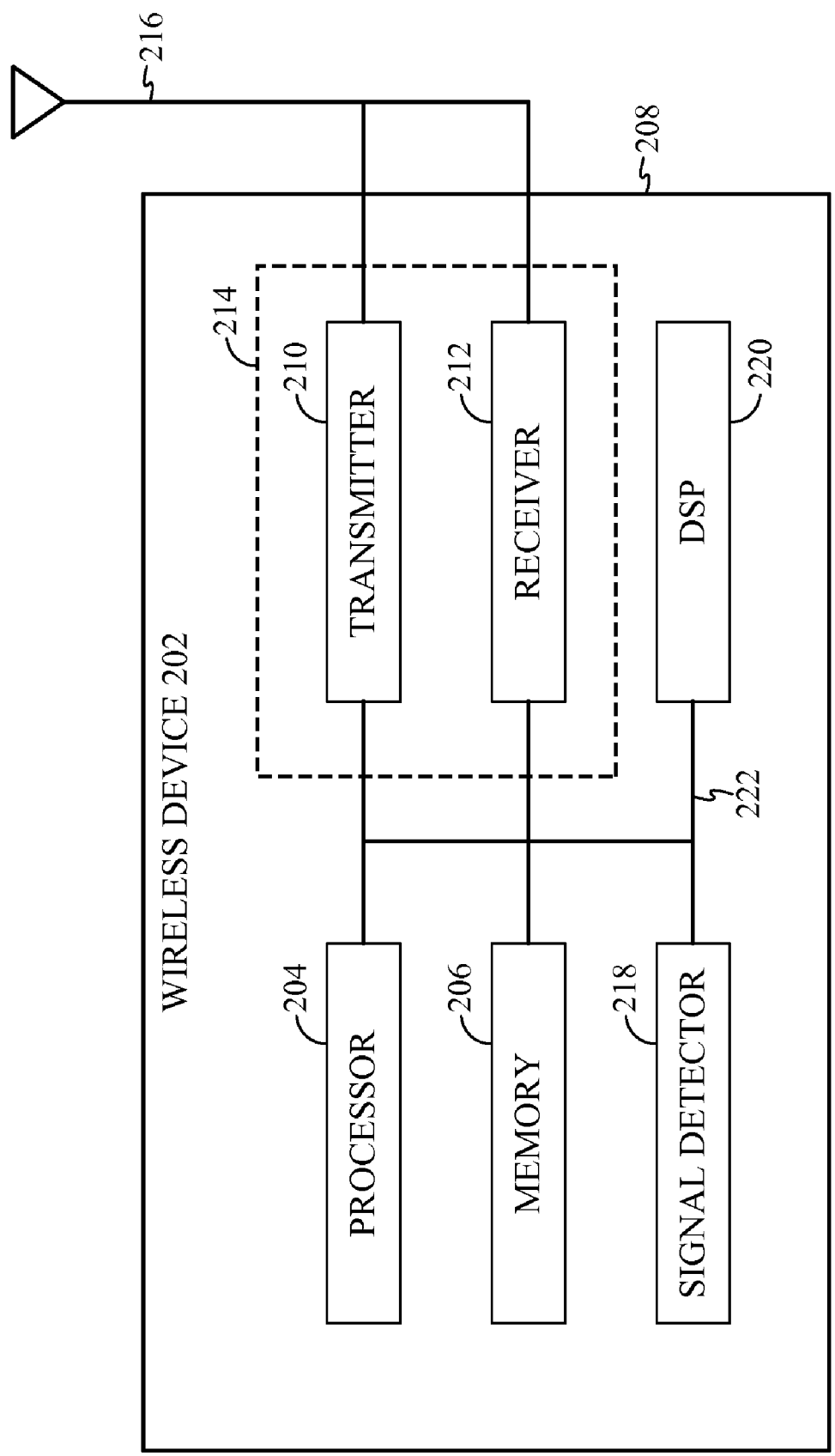
FIG. 2 illustrates various components that may be utilized in a wireless device in accordance with certain embodiments of the present disclosure.

FIG. 2 illustrates various components that may be utilized in a wireless device 202 that may be employed within the wireless communication system 100. The wireless device 202 is an example of a device that may be configured to implement the various methods described herein. The wireless device 202 may be a base station 104 or a user terminal 106.

The wireless device 202 may include a processor 204 which controls operation of the wireless device 202. The processor 204 may also be referred to as a central processing unit (CPU). Memory 206, which may include both read-only memory (ROM) and random access memory (RAM), provides instructions and data to the processor 204. A portion of the memory 206 may also include non-volatile random access memory (NVRAM). The processor 204 typically performs logical and arithmetic operations based on program instructions stored within the memory 206. The instructions in the memory 206 may be executable to implement the methods described herein.

The wireless device 202 may also include a housing 208 that may include a transmitter 210 and a receiver 212 to allow transmission and reception of data between the wireless device 202 and a remote location. The transmitter 210 and receiver 212 may be combined into a transceiver 214. An antenna 216 may be attached to the housing 208 and electrically coupled to the transceiver 214. The wireless device 202 may also include (not shown) multiple transmitters, multiple receivers, multiple transceivers, and/or multiple antennas.

The wireless device 202 may also include a signal detector 218 that may be used in an effort to detect and quantify the level of signals received by the transceiver 214. The signal detector 218 may detect such signals as total energy, pilot energy per pseudonoise (PN) chips, power spectral density and other signals. The wireless device 202 may also include a digital signal processor (DSP) 220 for use in processing signals.

The various components of the wireless device 202 may be coupled together by a bus system 222, which may include a power bus, a control signal bus, and a status signal bus in addition to a data bus.

Figure 3:
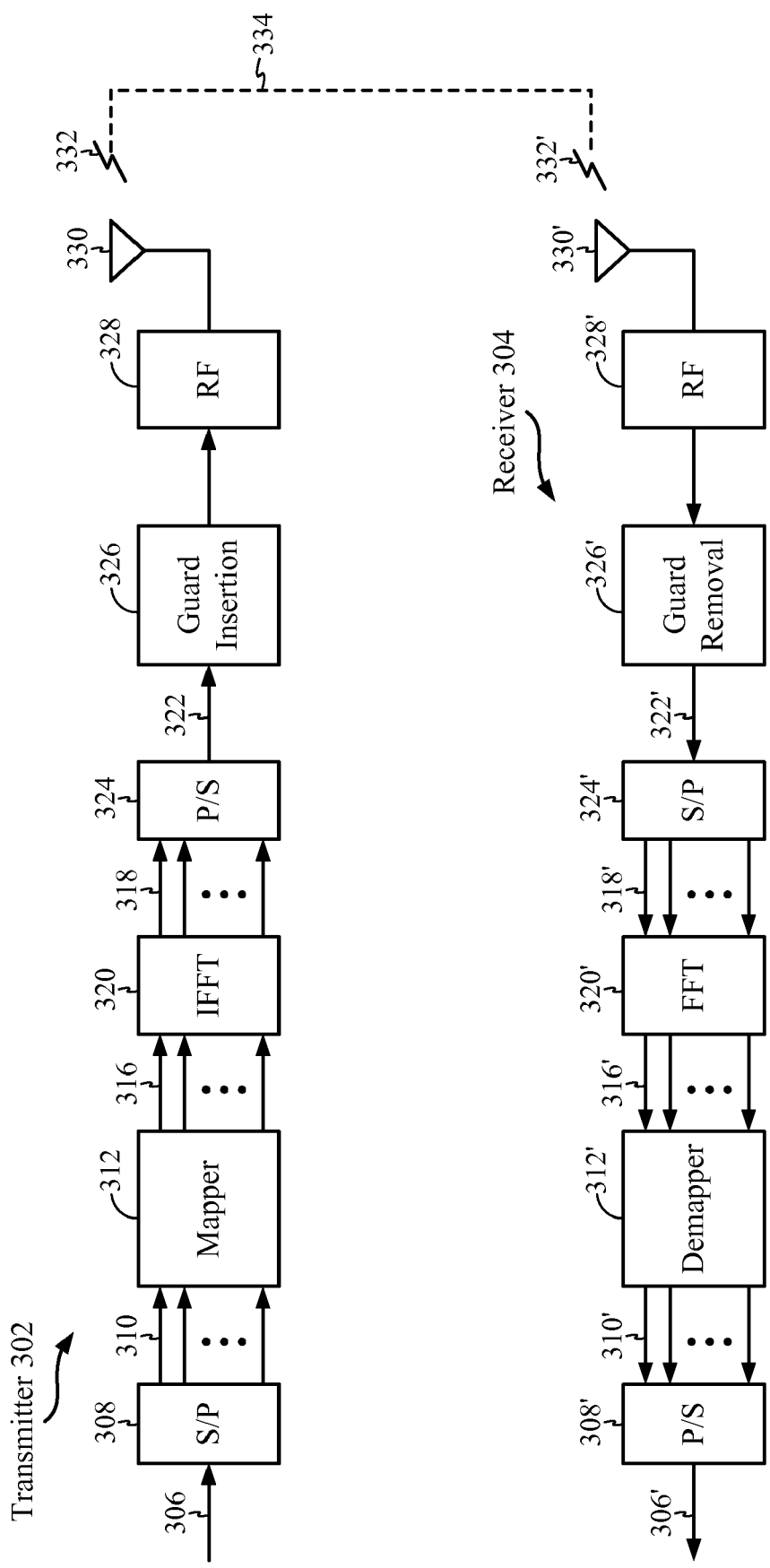
FIG. 3 illustrates an example transmitter and an example receiver that may be used within a wireless communication system that utilizes orthogonal frequency-division multiplexing and orthogonal frequency division multiple access (OFDM/OFDMA) technology in accordance with certain embodiments of the present disclosure.

FIG. 3 illustrates an example of a transmitter 302 that may be used within a wireless communication system 100 that utilizes OFDM/OFDMA. Portions of the transmitter 302 may be implemented in the transmitter 210 of a wireless device 202. The transmitter 302 may be implemented in a base station 104 for transmitting data 306 to a user terminal 106 on a downlink 108. The transmitter 302 may also be implemented in a user terminal 106 for transmitting data 306 to a base station 104 on an uplink 110.

Data 306 to be transmitted is shown being provided as input to a serial-to-parallel (S/P) converter 308. The S/P converter 308 may split the transmission data into N parallel data streams 310.

The N parallel data streams 310 may then be provided as input to a mapper 312. The mapper 312 may map the N parallel data streams 310 onto N constellation points. The mapping may be done using some modulation constellation, such as binary phase-shift keying (BPSK), quadrature phase-shift keying (QPSK), 8 phase-shift keying (8PSK), quadrature amplitude modulation (QAM), etc. Thus, the mapper 312 may output N parallel symbol streams 316, each symbol stream 316 corresponding to one of the N orthogonal subcarriers of the inverse fast Fourier transform (IFFT) 320. These N parallel symbol streams 316 are represented in the frequency domain and may be converted into N parallel time domain sample streams 318 by an IFFT component 320.

A brief note about terminology will now be provided. N parallel modulations in the frequency domain are equal to N modulation symbols in the frequency domain, which are equal to N mapping and N-point IFFT in the frequency domain, which is equal to one (useful) OFDM symbol in the time domain, which is equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

FIG. 3 also illustrates an example of a receiver 304 that may be used within a wireless device 202 that utilizes OFDM/OFDMA. Portions of the receiver 304 may be implemented in the receiver 212 of a wireless device 202. The receiver 304 may be implemented in a user terminal 106 for receiving data 306 from a base station 104 on a downlink 108. The receiver 304 may also be implemented in a base station 104 for receiving data 306 from a user terminal 106 on an uplink 110.

The transmitted signal 332 is shown traveling over a wireless channel. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The S/P converter 324' may divide the OFDM/OFDMA symbol stream 322' into the N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312 thereby outputting N parallel data streams 310'. A P/S converter 308' may combine the N parallel data streams 310' into a single data stream 306'. Ideally, this data stream 306' corresponds to the data 306 that was provided as input to the transmitter 302. Note that elements 308', 310', 312', 316', 320', 318' and 324' may all be found on a in a baseband processor 340'.

Exemplary Threshold Switches for Protocol Accelerators Used with Mobile Devices

By controlling whether or not operations are offloaded to a hardware protocol accelerator (or protocol stack hardware-PS HW) as a function of data rate, embodiments of the present disclosure may allow for reduced power consumption. For certain embodiments, the PS HW may be powered down partially or completely to conserve power. For certain embodiments, merely limiting the relative number of operations offloaded to the PS HW may help conserve power by reducing switching of the PS HW. As will be described in greater detail below, one or more switches may be controlled based on monitored data rate of connections to effectively enable or disable the PS HW.

Figure 4:
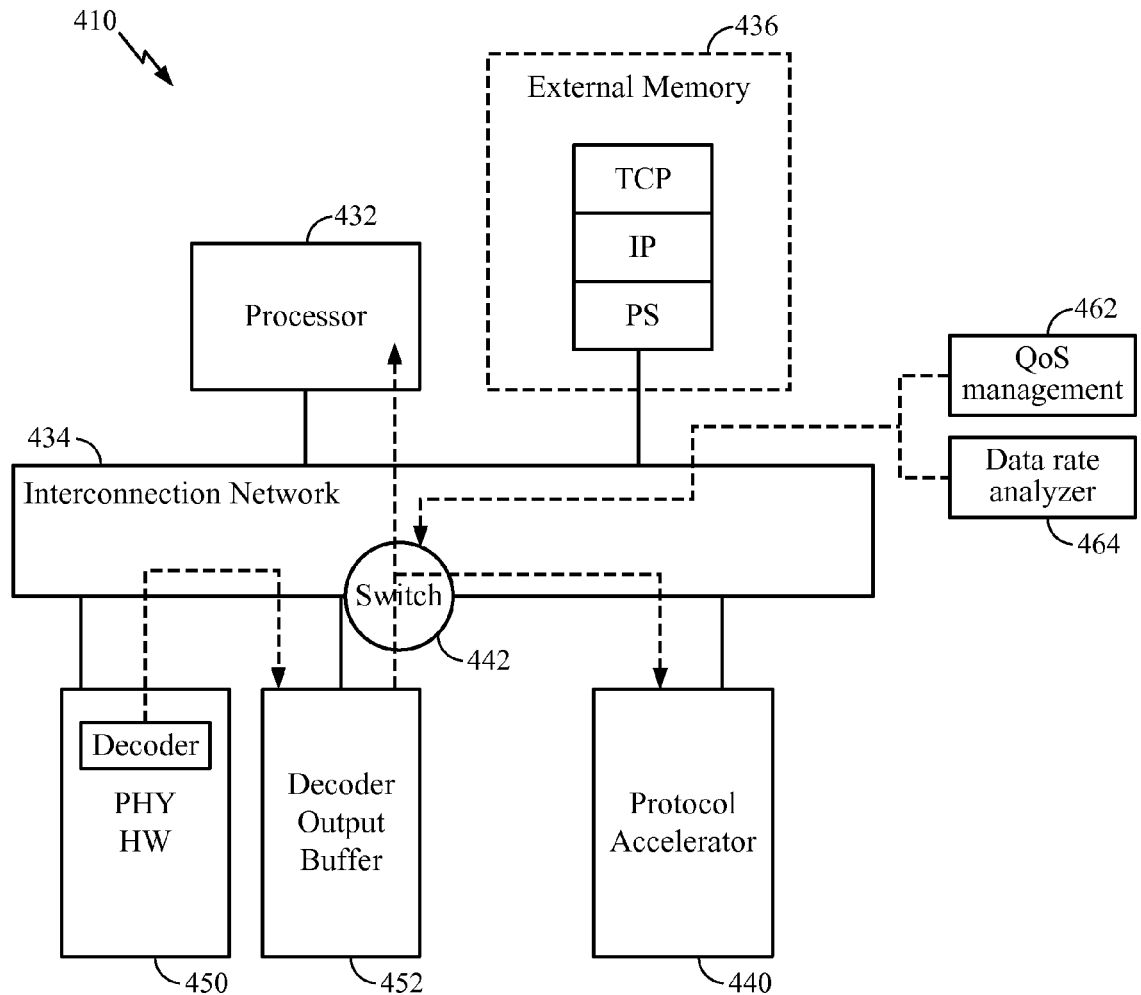
FIG. 4 illustrates an example mobile device utilizing a hardware protocol accelerator, in accordance with certain embodiments of the present disclosure.

FIG. 4 illustrates a block diagram of an example mobile device 410 capable of offloading operations from a processor 432 to protocol stack hardware (PS HW) 440. In general, a packet may be decoded by physical layer hardware (PHY HW) 450 and, assuming successful decoding, the packet may be passed to a PHY buffer 452. An interconnection network 434 may route packets from the PHY buffer 452 to external memory 436, where corresponding operations may be performed by the PS HW 440 or the processor 432, via external memory 436.

In general, the PS HW 440 outperforms the processor 432 (executing instructions) in most types of operations with a significant gain as measured by clock cycles. Thus, having the PS HW 440 begin pre-processing data that will be further processed in upper layers may result in substantial improvement in performance and allow higher data rates to be supported.

However, when data rates fall below a certain threshold, the likelihood of segmented or fragmented data may be increased. Such data may not be suitable for processing by the PS HW 440 and, further, the PS HW 440 may spend significant resources just to detect fragmented data that it will not process anyway. Thus, power consumption may be reduced by disabling the PS HW 440 when low data rates are detected. Thus, one or more switches 442 may allow the PS HW 440 to be enabled and disabled. For certain embodiments, the switches 442 may also allow control of the relative amount of operations offloaded to the PS HW 440.

For certain embodiments, potential data rates for connections may be determined based on Quality of Service (QoS) information. Using a QoS approach, when QoS information indicates that active connections have the potential to result in low data rate connections with fragmented or segmented data, the PS HW may be disabled to save more power. For certain embodiments, overall data rate may also be monitored. For example, if the overall data rate is low, it indicates that the processor has the enough bandwidth to process the downlink data, so there is no performance impact for the processor without using the Protocol Accelerator to offload some of the operations from its load.

For certain embodiments, the MS 410 may have components to analyze QoS statistics, determine potential data rates for each connection, as well as overall aggregate data rates. For example, as illustrated in FIG. 4, the MS 410 may include a QoS manager 462 and a data rate analyzer 464. The QoS manager 462 may determine minimum and maximum data rates for each connection, based on QoS parameters.

There are at least five different types of QoS: unsolicited grant service (UGS), real-time variable rate service (RT-VR), extended real-time variable rate service (ERT-VR), non-real-time variable rate service (NRT-VR), and Best Effort (BE). The UGS, RT-VR, ERT-VR, and NRT-VR QoS types mandate minimal and maximal data rates for connections. The BE QoS type only requires information for maximal data rate to be provided.

The QoS manager 462 may gather this information regarding minimal and maximal data rates and pass the information on to the data rate analyzer 464. The data rate analyzer 464 may, in turn, analyze the individual minimum and maximum data rates for each connection, in order to predict whether the total data rate for all the registered connections will be low or not, which may result in fragmented data, and may control the switches 442 to enable/disable the PS HW 440 as appropriate.

Figure 5:
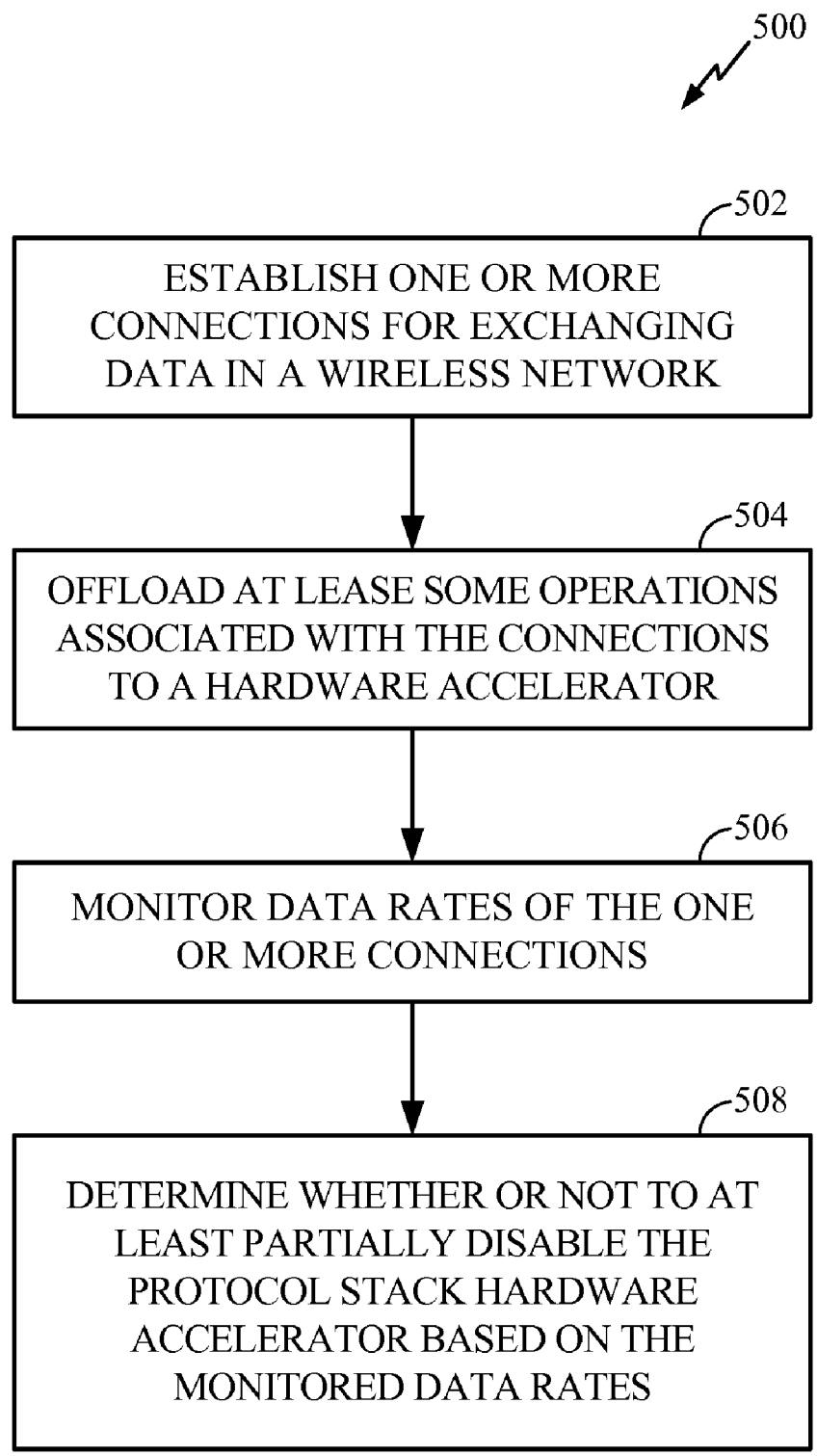
FIG. 5 illustrates example operations for controlling a protocol accelerator based on data rate, in accordance with certain embodiments of the present disclosure.

FIG. 5 illustrates example operations 500 that may be performed, for example, by the QoS manager 462 and data rate analyzer 464. The operations begin, at 502, by establishing one or more connections for exchanging data in a wireless network. At 504, at least some operations associated with the connections are offloaded to a protocol stack hardware accelerator. At 506, data rates for the connections are monitored and, at 508, a determination is made whether or not to at least partially disable the protocol stack hardware accelerator based on the monitored data rates.

For certain embodiments, a combination of allowable minimum and maximum data rates, as determined by QoS parameters, as well as actual average data rates for each connection may be considered when determining whether or not to at least partially disable the protocol stack hardware accelerator based on the monitored data rates.

Figure 6:
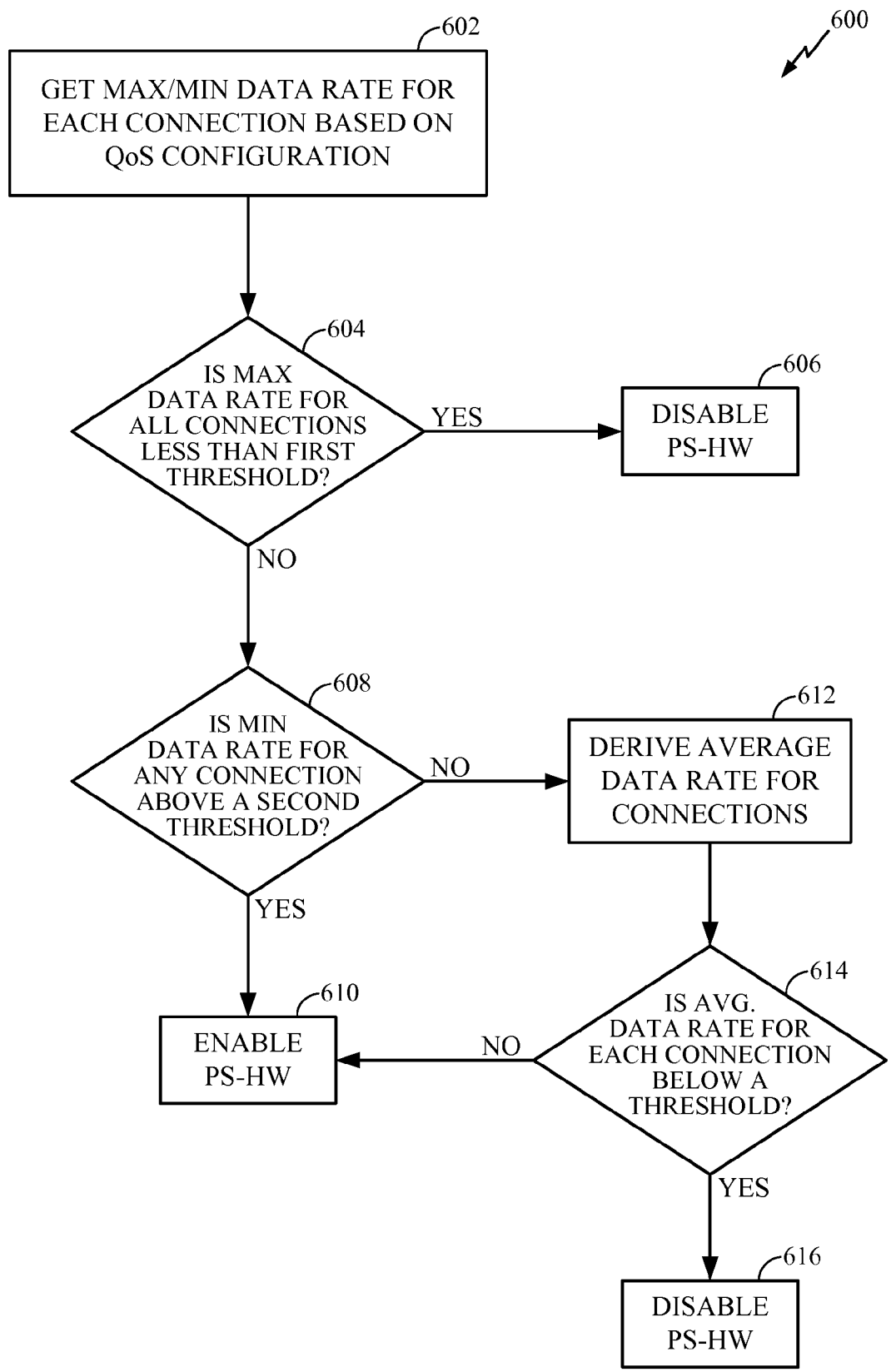
FIG. 6 illustrates example operations for determining when to disable a protocol accelerator based on data rate, in accordance with certain embodiments of the present disclosure.

FIG. 6 illustrates example operations 600 that take into consideration QoS configuration information as well as actual average data rates for each connection. The operations begin, at 602, by obtaining maximum and minimum data rates for each connection, based on QoS configuration information.

If the maximum data rates for all of the connections are less than a first threshold, as determined at 604, the PS-HW may be disabled, at 606. In other words, if the maximum data rate for each connection is low enough, it may be predicted that each connection will be low data rate resulting in fragmented data not suitable for processing by the PS-HW. Further, that the overall (aggregate) data rate will likely be low enough that the processor will have sufficient bandwidth to handle the processing that would otherwise have been offloaded. Thus, with little or no performance penalty power savings may be achieved by disabling the PS-HW.

On the other hand, if the minimum data rate for any of the connections is above a second threshold, as determined at 608, the PS-HW may be enabled, at 610. In other words, the second threshold may be selected such that if a minimum data rate exceeds the second threshold, a connection is guaranteed to be of sufficient data rate to justify offloading at least some operations to the PS-HW.

If neither condition in 604 or 608 is satisfied based on the QoS configuration, the PS-HW may be controlled based on actual data rate of the connections. Therefore, an actual average data rate for each connection may be derived, at 612. For certain embodiments, average data rate may be determined by monitoring the protocol stack. Means and variances of the total average data rate for each connection may also be determined.

In any case, similar analyses of these measured data rates may be performed to determine if the PS-HW should be disabled. For example, at 614, a determination may be made as to whether the average data rate for each connection is below a third threshold (which may be the same or different from the first threshold). If the average data rate for each connection is below the third threshold, the PS-HW may be disabled, at 616. Otherwise, the PS-HW may remain in the same state or enabled, at 610.

While the above descriptions have referred to disabling or enabling a PS HW, for certain embodiments, similar reductions in power consumption may be gained by varying the relative percentage of operations offloaded to the PS HW. In other words, rather than completely disable the PS HW, the PS HW may be only partially disabled, for example, by reducing the number of operations offloaded thereto.

By disabling the PS HW in scenarios when there are low data rate connections, power consumption may be reduced. By analyzing the data rates and controlling the PS HW accordingly, this reduction in power consumption may be achieved with little or not impact on performance, as the processor bandwidth may be sufficient to perform the operations that would have been otherwise offloaded.

Figure 5A:
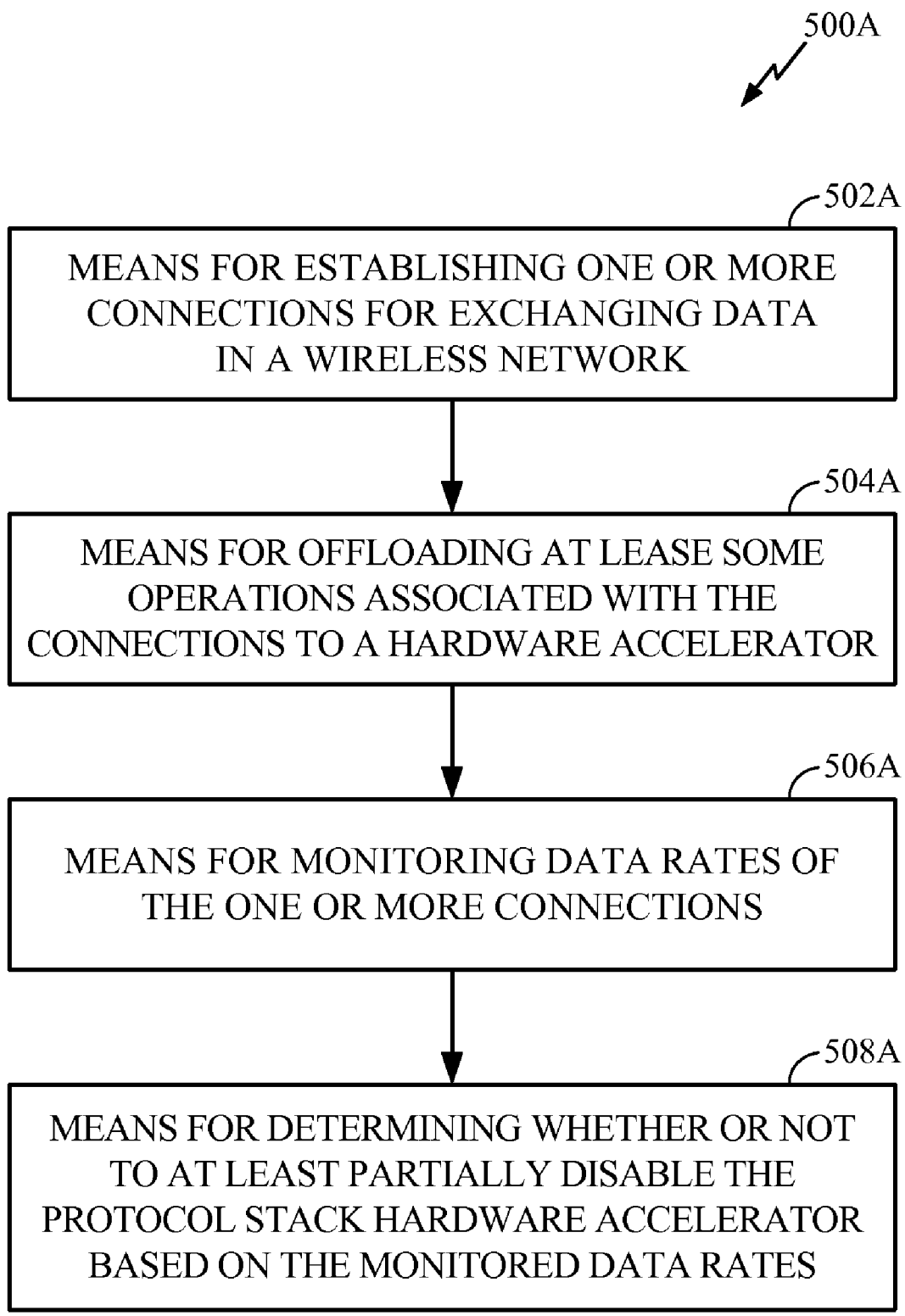
FIG. 5A illustrates example components capable of performing the operations shown in FIG. 5.

The various operations of methods described above may be performed by various hardware and/or software component (s) and/or module(s) corresponding to means-plus-function blocks illustrated in the Figures. Generally, where there are methods illustrated in Figures having corresponding counterpart means-plus-function Figures, the operation blocks correspond to means-plus-function blocks with similar numbering. For example, operations 500 illustrated in FIG. 5 correspond to means-plus-function blocks 500A illustrated in FIG. 5A.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware or any combination thereof. If implemented in software, the functions may be stored as one or more instructions on a computer-readable medium. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communications, comprising:
   establishing one or more connections for exchanging data in a wireless network;
   offloading a set of operations associated with the connections to a protocol stack hardware accelerator;
   monitoring data rates of the one or more connections;
   determining a maximum allowable data rate for each of the connections, based on quality of service (QoS) information;
   determining whether or not the maximum allowable data rate for each connection is below a first threshold value;
   at least partially disabling the protocol stack hardware accelerator if the maximum allowable data rate for each connection is below the first threshold value;
   determining a total average data rate for each of the connections;
   determining whether or not the total average data rate for each connection is below a second threshold value; and
   at least partially disabling the protocol stack hardware accelerator if the total average data rate for each connection is below the second threshold value.

2. The method of claim 1, further comprising:
   determining a minimum allowable data rate for each of the connections, based on quality of service (QoS) information; and
   at least partially enabling the protocol stack hardware accelerator if the minimum allowable data rate for any of the connections is above a threshold value.

3. The method of claim 1, wherein at least partially disabling the protocol stack hardware accelerator if the maximum allowable data rate for each connection is below the first threshold value comprises controlling one or more switches to power down at least a portion of the protocol stack hardware accelerator.

4. An apparatus for wireless communications, comprising:
   a processor; and
   a memory, the memory comprising:
      tangible logic for establishing one or more connections for exchanging data in a wireless network;
      tangible logic for offloading a set of operations associated with the connections to a protocol stack hardware accelerator;
      tangible logic for monitoring data rates of the one or more connections;
      tangible logic for determining a maximum allowable data rate for each of the connections, based on quality of service (QoS) information;
      tangible logic for determining whether or not the maximum allowable data rate for each connection is below a first threshold value;
      tangible logic for at least partially disabling the protocol stack hardware accelerator if the maximum allowable data rate for each connection is below the first threshold value;
      tangible logic for determining a total average data rate for each of the connections;
      tangible logic for determining whether or not the total average data rate for each connection is below a second threshold value; and
      tangible logic for at least partially disabling the protocol stack hardware accelerator if the total average data rate for each connection is below the second threshold value.

5. The apparatus of claim 4, further comprising:
   tangible logic for determining a minimum allowable data rate for each of the connections, based on quality of service (QoS) information and at least partially enabling the protocol stack hardware accelerator if the minimum allowable data rate for any of the connections is above a threshold value.

6. The apparatus of claim 4, wherein the tangible logic for at least partially disabling the protocol stack hardware accelerator if the maximum allowable data rate for each connection is below the first threshold value comprises logic for controlling one or more switches to power down at least a portion of the protocol stack hardware accelerator.

7. An apparatus for wireless communications, comprising:
   a processor;
   a memory;
   circuitry for establishing one or more connections for exchanging data in a wireless network;
   circuitry for offloading a set of operations associated with the connections to a protocol stack hardware accelerator;
   circuitry for monitoring data rates of the one or more connections;
   circuitry for determining a maximum allowable data rate for each of the connections, based on quality of service (QoS) information;
   circuitry for determining whether or not the maximum allowable data rate for each connection is below a first threshold value;
   circuitry for at least partially disabling the protocol stack hardware accelerator if the maximum allowable data rate for each connection is below the first threshold value;

circuitry for determining a total average data rate for each of the connections;

circuitry for determining whether or not the total average data rate for each connection is below a second threshold value; and circuitry for at least partially disabling the protocol stack hardware accelerator if the total average data rate for each connection is below the second threshold value.

8. The apparatus of claim 7, further comprising:

circuitry for determining a minimum allowable data rate for each of the connections, based on quality of service (QoS) information and at least partially enabling the protocol stack hardware accelerator if the minimum allowable data rate for any of the connections is above a threshold value.

9. The apparatus of claim 7, wherein the circuitry for at least partially disabling the protocol stack hardware accelerator if the maximum allowable data rate for each connection is below the first threshold value comprises circuitry for controlling one or more switches to power down at least a portion of the protocol stack hardware accelerator.

10. A computer-program product for wireless communications, comprising a non-transitory computer readable medium having instructions stored thereon, the instructions being executable by one or more processors and the instructions comprising:

instructions for establishing one or more connections for exchanging data in a wireless network;

instructions for offloading a set of operations associated with the connections to a protocol stack hardware accelerator;

instructions for monitoring data rates of the one or more connections;

instructions for determining a maximum allowable data rate for each of the connections, based on quality of service (QoS) information;

instructions for determining whether or not the maximum allowable data rate for each connection is below a first threshold value;

instructions for at least partially disabling the protocol stack hardware accelerator if the maximum allowable data rate for each connection is below the first threshold value;

instructions for determining a total average data rate for each of the connections;

instructions for determining whether or not the total average data rate for each connection is below a second threshold value; and instructions for at least partially disabling the protocol stack hardware accelerator if the total average data rate for each connection is below the second threshold value.

11. The computer-program product of claim 10, further comprising:

instructions for determining a minimum allowable data rate for each of the connections, based on quality of service (QoS) information and at least partially enabling the protocol stack hardware accelerator if the minimum allowable data rate for any of the connections is above a threshold value.

12. The computer-program product of claim 10, wherein the instructions for at least partially disabling the protocol stack hardware accelerator if the maximum allowable data rate for each connection is below the first threshold value comprise instructions for controlling one or more switches to power down at least a portion of the protocol stack hardware accelerator.

* * * * *